United States Patent [19]
Lee

[11] Patent Number: 5,416,394
[45] Date of Patent: May 16, 1995

[54] MOTOR CONTROL METHOD AND APPARATUS THEREOF IN NUMERICAL CONTROL SYSTEMS

[75] Inventor: Yun-Seak Lee, Suwon-City, Rep. of Korea

[73] Assignee: Samsung Electronics Co., Ltd., Suwon City, Rep. of Korea

[21] Appl. No.: 124,551

[22] Filed: Sep. 22, 1993

[30] Foreign Application Priority Data

Sep. 25, 1992 [KR] Rep. of Korea .................... 92-17529

[51] Int. Cl.$^6$ .............................................. G05B 19/18
[52] U.S. Cl. .................................... 318/569; 318/600; 318/568.1; 318/560; 318/568.19; 364/474.36
[58] Field of Search ...................... 318/569, 600, 568.1, 318/560, 562, 568.19; 364/474.36, 474.27

[56] References Cited

U.S. PATENT DOCUMENTS

| | | | |
|---|---|---|---|
| 5,034,672 | 7/1991 | Sakamoto et al. | 318/569 |
| 5,162,714 | 11/1992 | Ikeda et al. | 318/569 |
| 5,223,777 | 6/1993 | Werner et al. | 318/569 |
| 5,270,627 | 12/1993 | Rehse | 318/569 |

FOREIGN PATENT DOCUMENTS 1-209504  8/1989  Japan .

*Primary Examiner*—William M. Shoop, Jr.
*Assistant Examiner*—Karen Masih
*Attorney, Agent, or Firm*—Burns, Doane, Swecker & Mathis

[57] ABSTRACT

The present invention relates to a motor control method and apparatus therefor in a numerical control system of using an exclusive computer equipped with a built-in program, where an administration computer calculates an initial value corresponding to a displacement amount to be driven by each axis of a motor, and where a motor control computer controls a driving of the motor in accordance with the displacement amount of the motor corresponding to the initial value calculated from the administration computer, thereby enabling to perform the numerical control function by sharing the same between computers, so that an execution velocity needed for the numerical control can be reduced and an adaptive control can be swiftly performed to meet instantly-changing situations as well.

6 Claims, 3 Drawing Sheets

MOTOR CONTROL METHOD AND APPARATUS THEREOF IN NUMERICAL CONTROL SYSTEMS

BACKGROUND OF THE INVENTION

1. Field of the Invention

The present invention relates to a numerical control system using a special purpose computer of a built-in program type in order to perform a numerical control function, and more particularly to a motor control method and an apparatus therefor in the numerical control system for performing the numerical control function by sharing the same between computers, so that an execution time needed for the numerical control can be shortened.

2. Description of the Prior Art

Generally, the numerical control system mainly performs an automatic control of a machine tool, and more specifically performs chiefly a position set control.

If the numerical control system is applied to an industrial robot, the system controls a transfer of a lathe or a knuckle operation of a robot actuator, which is generally executed by a driving force of an electric motor.

Accordingly, the control on the transfer of the lathe or the knuckle operation of the actuator immediately implies a control of the motor.

The actuator (hereinafter referred to as a control object) travels along several straight lines and curve routes in a three-dimensional coordinate system, and an initial value against the routes thereof is calculated by a computer disposed within the numerical control system when a terminal coordinate of various interpolations and a speed command are given.

The initial value of various interpolations, by way of example, in a linear interpolation, implies a displacement amount per 1 msec generated by rotation of each axis, and the displacement amount corresponds to the number of pulses.

In a circular interpolation, the initial value represents an angle to an end point and the displacement amount rotated by the motor, in other words, the number of pulses.

In other words, if the coordinates and the speed are given, the computer divides the curve appropriately to thereby calculate the initial value by way of a mathematical calculating method.

Accordingly, the initial value of the linear interpolation can be calculated if only two points in a three-dimensional space are designated. The initial value of the circular interpolation can be derived by a designation of 3 points but the routes are calculated by an application of the circular interpolation in the case of a free curve interpolation.

For example, this kind of control apparatus has been presented in a Japanese laid-open Utility Model publication Showa 61-84906.

FIG. 1 is a block diagram for illustrating one embodiment of the conventional control apparatus, the apparatus comprising: a motor control computer 102 for executing a robotic system control; and an administration computer 101 for providing a control change command to the motor control computer (hereinafter referred to as a control computer) by monitoring at all times surrounding changes of an object operated by the robotic system and an apparatus therefor when an operational change is required.

The administration computer 101 transmits a coordinate of the end point and a speed command to the control computer 102 when a command indicative of an interpolation performance is received from a user, and the control computer 102 calculates an initial value corresponding to the interpolation and presently performs an interpolation algorithm.

Servo drivers $103_1$–$103_n$ drive the robotic system 104 in accordance with a result of the interpolation algorithm.

However, the motor control method of the conventional numerical control system thus described can not control the motor while the control computer is calculating the initial value, thereby causing a problem in that adaptive control to cope with an instantly changing situation can not be smoothly realized.

Furthermore, there has been a drawback in that the initial value calculation and even various interpolation algorithms are performed in the control computer, thereby increasing a capacity to subsequently call for a large capacity integrated circuits and to naturally increase production cost.

SUMMARY OF THE INVENTION

Accordingly, the present invention has been provided to solve the conventional problem thus described and it is an object of the present invention to provide a motor control method and an apparatus therefor in a numerical control system for performing the numerical control function by sharing the same between computers, so that an execution time necessary for the numerical control can be shortened.

It is another object of the present invention to provide a motor control method and apparatus therefor in a numerical control system for performing a quick adaptive control under instantly changing circumstances.

In accordance with one aspect of the present invention, there is provided a motor control method in a numerical control system, the control method comprising the steps of (a) interpreting a parity check code-extended group code from a program previously prepared about a numerical control of the control object to thereby calculate a goal point on spatial coordinate axes to which the control object is to be displaced, the step for calculating a distance between the goal point and a present position of the control object on the coordinate, and the step for converting the displacement of each coordinate to be covered from the calculated distance data to the pulses corresponding to the initial value to thereby allow the number of pulses to indicate the travelled distance; (b) storing the initial value corresponding to the number of pulses calculated from the step (a) in a bi-directional memory means; and (c) calling the initial value stored at the step (b) to thereby control a motor for applying a driving force to the control object in response to the initial value, where the step (a) is performed by the administration computer and the step (c) is performed by the motor control computer.

In accordance with another aspect of the present invention, there is provided a motor control apparatus in a numerical control system, the control apparatus comprising: an administration computer, the computer for reading the parity check code-extended group code from the previously prepared program for defining a numerical control procedure of the control object to thereby calculate a goal point on the spatial coordinate on which the control object is to displace, the computer for calculating the distance between the goal point and a present position of the control object on the coordinate by the initial value, the computer for converting the calculated distance data to pulses corresponding to a digital signal the computer can utilize, so that the number of the pulses can display the travelled distance;

a bi-directional memory means for storing the initial value corresponding to the number of pulses calculated from the administration computer;

a motor control computer for calling the initial value stored in the bi-directional memory means and for performing an accelerating/decelerating routine for dividing the initial value into an accelerating velocity section, uniform velocity section and a decelerating velocity section to thereby calculate the number of pulses for each accelerating velocity section at the accelerating-/decelerating velocity routine; and a motor driver for driving a servo motor connected to the control object in accordance with the number of the pulses for each section calculated from the control computer, where the administration computer calculates the number of pulses corresponding to a distance to be covered by the motor when an interrupt signal is received from the motor control computer in the midst of performance of monitoring at all times surrounding changes of the control object, and at the same time, outputs the interrupt signal to the control computer, whereas the control computer calculates the displacement amount of the control object per the accelerating-/decelerating routine and per the section when the interrupt signal is received from the administration computer and outputs the interrupt signal to the administration computer when the motor driver completes the operation in response to the calculated displacement amount of the control object.

BRIEF DESCRIPTION OF THE DRAWINGS

For fuller understanding of the nature and objects of the invention, reference should be made to the following detailed description taken in conjunction with the accompanying drawings in which.

DETAILED DESCRIPTION OF THE INVENTION

A detailed description of a preferred embodiment in accordance with the present invention will be explained with reference to the accompanying drawings.

Figure 1:
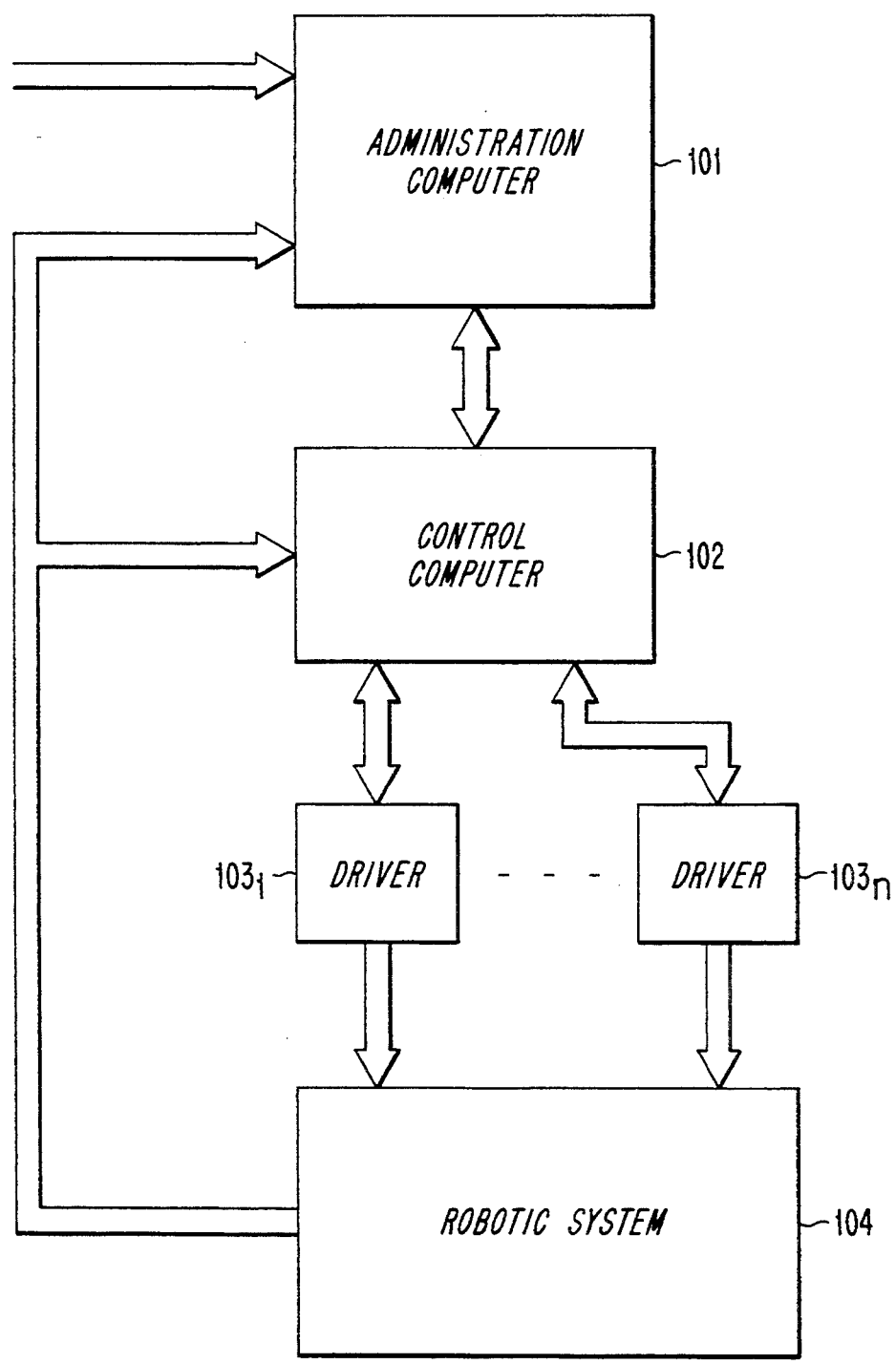
FIG. 1 is a block diagram for illustrating a motor control apparatus comprising a conventional numerical control system.
Figure 2:
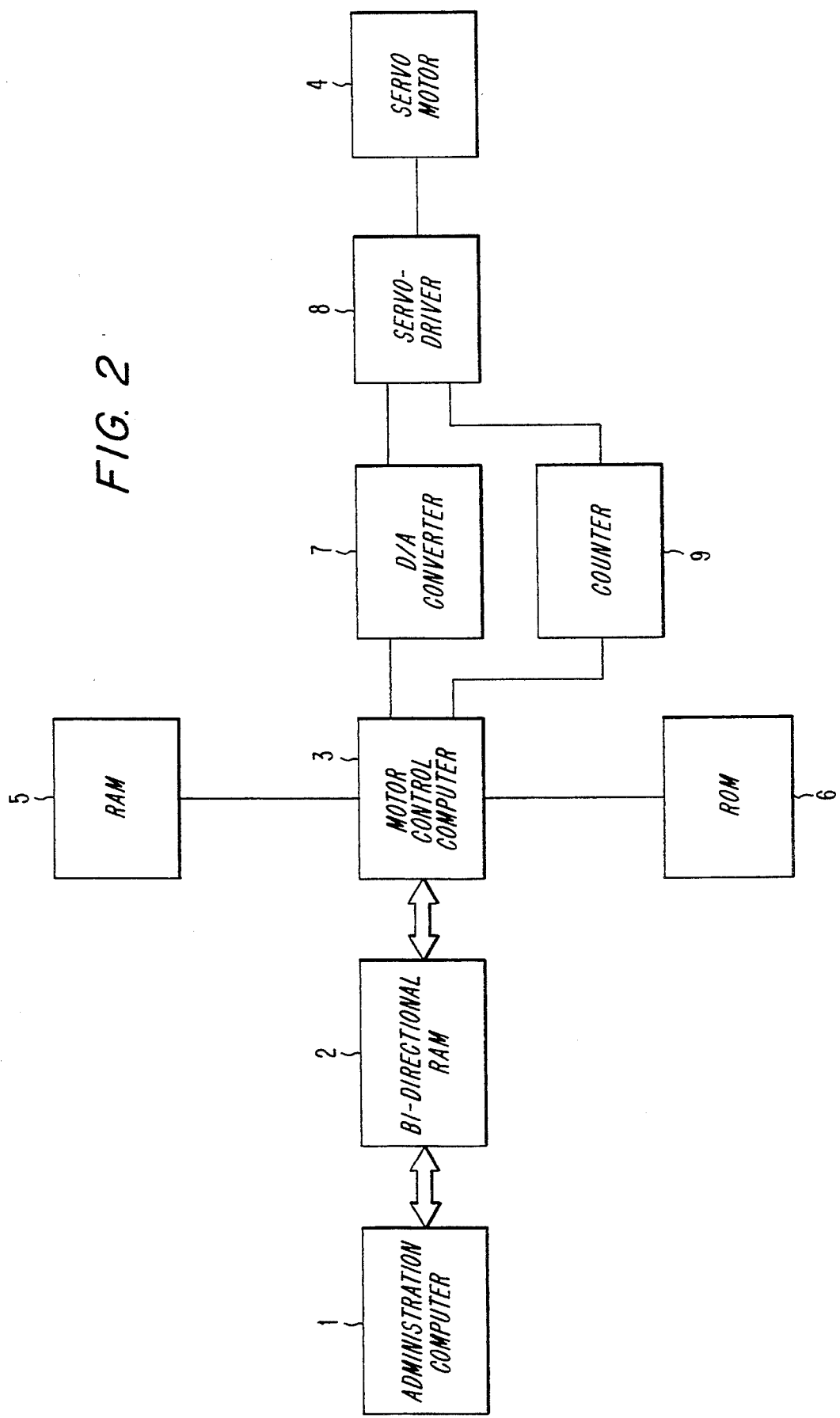
FIG. 2 is a block diagram for illustrating a motor control apparatus comprising a numerical control system in accordance with the present invention.

FIG. 2 is an overall block diagram for illustrating a motor control apparatus comprising a numerical control system in accordance with the present invention, in which reference numeral 1 represents an administration computer for calculating the initial value of various interpolations.

What is called herein an initial value in a linear interpolation is a travelled distance between a present position of the control object and a goal point to be covered by the control object when the control object is seen from each coordinate, and more specifically, the travelled distance is sampled for every 1 msec to achieve accurate control.

Furthermore, the goal point is discriminated by interpreting a group code which is an extended parity check code previously prepared for the purpose of the numerical control.

Accordingly, the administration computer divides the distance to be covered by the control object by a travelling speed the user has inputted to thereby calculate the travelled distance per 1 msec, and converts the travelled distance to pulses which are digital signals suitable for the computer. In other words, the travelled distance corresponds to the number of pulses.

Meanwhile, the initial value in the circular interpolation represents an angle between the present position where the control object is situated and the goal point, and the angle is converted to pulses of digital signals as in the linear interpolation. Accordingly, the displacement angle corresponds to the number of pulses.

The initial value calculated in the administration computer 1 is stored in a bi-directional Random Access Memory RAM 2, a kind of memory means, which in turn is connected to the motor control computer 3, so that the initial value can be read.

The motor control computer (hereinafter called as control computer) reads the initial value stored in the bi-directional RAM 2, thereby dividing the section being covered by the control object into the accelerating velocity section, uniform velocity section and the decelerating velocity section.

In other words, the control computer 3 performs an accelerating/decelerating velocity sub-routine lest an over-shoot be generated when the control object is controlled.

The accelerating/decelerating velocity sub-routine is performed by the user's program stored in a RAM 6 and a monitor program stored in a Read Only Memory ROM 5.

Meanwhile, a Digital-to-Analog Converter DAC 7 converts to an analog value the number of pulses for each accelerating velocity section output from the control computer 3, thereby applying the same to a servo driver 8, which in turn controls a servo motor 4 for applying a driving force to the control object in accordance with the control amount converted to the analog signal, whereas revolutions of the motor 4 are detected by a counter 9.

Accordingly, the control computer 3 discriminates whether or not the motor has been controlled in accordance with the detected signal supplied from the counter 9.

Meanwhile, as seen from the foregoing, the following conditions are needed to control the motor 4, in order that the administration computer 1 may calculate the initial value corresponding to a distance to be covered by the control object in a form of the number of pulses, and the control computer 3 may allow the motor 4 to be displaced smoothly over the accelerating/decelerating velocity section in accordance with the initial value thus calculated.

In other words, after the motor control has been completed in accordance with the calculated initial value, the control computer 3 applies the interrupt signal to the administration computer 1 which has been performing the monitor program and the user's program except for the initial value calculation.

At this moment, the administration computer 1 stops performing all programs hitherto progressed, and from this moment, returns important data to a main memory unit to thereafter move to a program for calculation of an initial value starting from a specific address.

The administration computer 1 calculates the initial value with the program return to thereafter apply the interrupt signal to the control computer 3.

Accordingly, the interrupted control computer 3 calls the initial value stored in the bi-directional RAM 2 to perform the accelerating/decelerating velocity routine and the motor control function in the same process as mentioned in the above.

Next, the motor control method in accordance with the present invention will be described.

Figure 3:
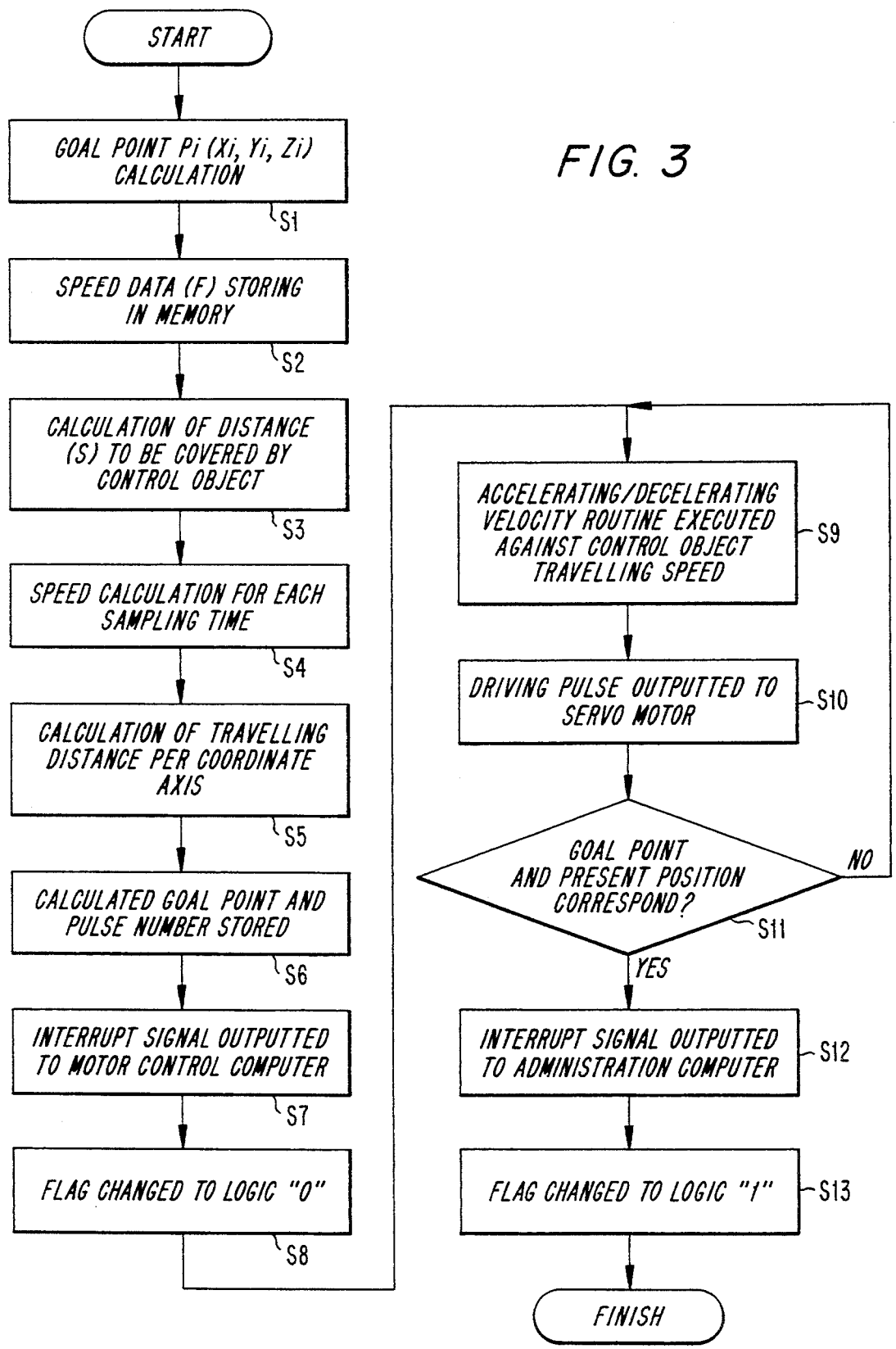
FIG. 3 is a flow chart for illustrating a control sequence of the motor control apparatus in accordance with the present invention.

The Symbol S in FIG. 3 designates a step.

In FIG. 3, if the control computer 3 finishes a performance of P (i−1)th command, the control computer 3 outputs the interrupt signal to the administration computer 1 and performs the previously-prepared monitor program excluding the motor control or the user's program to stand clear of the motor control routine.

Meanwhile, the administration computer 1, in response to the interrupt signal supplied from the control computer 3, temporarily stops performing the programs hitherto progressed and performs an initial value calculation corresponding to the Pi th command.

In other words, the administration computer 1 interprets the group code of parity check code extended from the previously-prepared monitor program about the numerical control to thereby calculate the goal point Pi (Xi, Yi, Zi) (MM) on the spatial coordinate axes on which the control object is to be displaced.

Then, the administration computer 1 receives a user-input speed data F (MM/MIN) through an input apparatus (not shown) at step S2 and stores the same in a built-in memory (not shown), and at step S3, seeks a total distance S to be covered by the control object from the goal point Pi and the present position P(i−1)(X(i−1), Y (i−1), Z(i−1)) utilizing a formula (1) described hereunder.

$$S = [(Xi - X(i-1)) + (Yi - Y(i-1)) + (Zi - Z(i-1))](MM) \quad (1)$$

Proceeding to step S4, the administration computer calculates a speed (DELTA-S) during each sampling time by way of the following formula (2).

$$DELTA\text{-}S = F/(60 \times 1000) \ (MM/msec) \quad (2)$$

In the formula (2), the speed DELTA-S represents a speed at which the control object travels during the sampling time 1 msec and F defines a speed data received as an input at step S2.

Then, at step S5, a travelling distance on each coordinate axis to be covered by the control object during each sampling time is calculated by a program represented in the following formula (3).

Generally speaking, because the travelling distance of the control object is defined in an analog value, the computer converts the analog value to the digital value, which in turn is represented in the number of pulses.

$$\Delta X = [(Xi - X(i-1)) \times DELTA\text{-}S/S] \times CT \text{ (pulse/sec)} \quad (3)$$

In the foregoing formula (3), CT represents a ratio with a pitch of ball screw against the number of motor encoder pulse, and S stands for a travelling distance calculated from the step S3.

The ball screw is generally used for a transfer of a lathe and the ΔX represents a lathe travelling distance to the X axis.

The aforementioned has explained about calculation of displacement ΔX on the X axis, however because a displacement ΔY on the Y axis and a displacement ΔZ on the Z axis are calculated by the same process, explanations thereof will be omitted.

The initial value calculated from the administration computer, that is, the data of goal point Pi and ΔX ΔY ΔZ are stored in a random address of the bi-directional RAM 2 at step S6.

As seen from the aforesaid, if the administration computer 1 completes the calculation of the initial value corresponding to the travelling distance covered by the control object, the computer 1 outputs the interrupt signal to the control computer 3 at step S7, and performs the previously-prepared monitor program or user's program, away from the initial value calculation routine.

The administration computer 1 also converts a flag to a logic "0" status at step S8, which implies that the administration computer has finished the initial value calculation for performing the Pi th command.

The flag uses a parity flag for discriminating whether or not information has been accurately communicated between the administration computer 1 and the control computer 3 through the bi-directional RAM.

The operation sequences from the steps S1 to S8 are taken care of by the administration computer 1 and the operation sequences subsequent therefrom under the parity flag of logic "0" are progressed by the control computer 3.

As seen from the abovementioned, if the parity flag defines the logic "0", the control computer 3 first executes the accelerating/decelerating velocity routine related to the travelling speed of the control object at step S9 in order to execute an interpolation of the control object corresponding to the Pi th command.

In other words, at a point where the stopped control object is started, the control computer 3 allows the control object to be accelerated, and at a point where the accelerated control object is stopped, the computer 3 executes the accelerating/decelerating velocity routine, so that the control object can be decelerated.

Of course, the control object performs a uniform velocity movement outside of the accelerating and decelerating velocity sections.

At step S10, a pulse calculated from the accelerating/decelerating velocity routine and corresponding to a displacement amount against each axis is output in every velocity section to the servo motor 4 for driving the control object.

The present position to which the control object travels is compared with the goal point at step S11, and operations subsequent to step S9 are repeatedly performed until the goal point and the present position correspond. Furthermore, the moment the goal point and the present position correspond, the control computer 3 interrupts the administration computer 1 at step S12 allowing the administration computer 1 to calculate a future goal point P(i+1)(X(i+1), Y(i+1), Z(i+1)) of the control object.

At this moment, the parity flag of the control computer becomes a logic "1" at step S13 to thereby finish one cycle of operation for travelling the control object.

In other words, the administration computer changes the parity flag to "0" to thereby indicate that the calculation of goal point has been completed, and the motor control computer changes the parity flag to logic "1", thereby indicating that the operation of the control object has been completed.

In the above description, the administration computer 1 and control computer 3 are mutually communicated through an interrupt terminal formed in the bi-directional RAM 2 and effectively reduce errors generating during data transmissions by way of the parity flag.

The above explanation has described about a linear interpolation of the control object with reference to FIG. 3 but it should be apparent that the present invention can be applied to a circular interpolation and other various interpolations.

As seen from the foregoing, the present invention reduces an execution velocity needed for the numerical control by sharing the performance of the numerical control function between computers, which causes an effect of performing a quick adaptive control to the instantly changing situation.

What is claimed is:

1. A motor control method in a numerical control system, comprising the steps of:
   (a) in an administration computer, interpreting a parity check code-extended group code from a program previously prepared for performing numerical control of a control object to thereby calculate a goal point on spatial coordinate axes to where the control object is to be displaced, calculating a distance between the goal point and a present position of the control object on the coordinate axes, and converting displacement of each coordinate to be covered from the calculated distance to pulses corresponding to an initial value to thereby determine a number of pulses indicating a travelled distance;
   (b) storing the initial value corresponding to the determined number of pulses in bi-directional memory means; and
   (c) in a motor control computer, reading the initial value stored in the bi-directional memory to thereby control a motor for applying a driving force to the control object in response to the initial value.

2. A motor control method in a numerical control system as defined in claim 1, wherein the step (a) comprises the step of storing in memory means velocity data inputted by a user through an input apparatus and for calculating the number of pulses on each coordinate axis corresponding to a distance to be covered during a sampling period calculated from a distance to be displaced and the stored velocity data; and
   the step (b) comprises the step of reading the initial value stored in the bi-directional memory means to thereby perform an accelerating/decelerating routine for dividing the section where the control object travels into an accelerating velocity section, a uniform velocity section and a decelerating velocity section, and for controlling a motor for applying a driving force to the control object in accordance with the number of pulses per section calculated from the accelerating/decelerating velocity routine.

3. A motor control method in a numerical control system as defined in claim 2, wherein the step (a) is performed when control of the motor has been completed at step (b) and the motor control computer having discriminated the completion thereof applies an interrupt signal to the administration computer; and
   the step (b) is performed when the administration computer calculates the initial value at the step (a) to thereby store the initial value in the bi-directional memory means and the administration computer applies the interrupt signal to the motor control computer.

4. A motor control apparatus in a numerical control system comprising:
   an administration computer for reading a parity check code-extended group code from a previously prepared program for defining a numerical control procedure of a control object to thereby calculate a goal point on spatial coordinate axes to where the control object is to be displaced, for calculating distance data representing a distance between the goal point and a present position of the control object on the coordinate axes, and for converting the calculated distance data to pulses corresponding to digital signals the computer can utilize, so that the number of the pulses indicates travelled distance;
   bi-directional memory means for storing an initial value corresponding to the number of pulses calculated from the administration computer;
   a motor control computer for reading the initial value stored in the bi-directional memory means and for performing an accelerating/decelerating routine for dividing the initial value into an accelerating velocity section, uniform velocity section and a decelerating velocity section to thereby calculate the number of pulses for each accelerating velocity section at the accelerating/decelerating velocity routine; and
   a motor driver for driving a servo motor connected to the control object in accordance with the number of the pulses for each section calculated from the control computer,
   wherein the administration computer calculates the number of pulses corresponding to a distance to be covered by the motor when an interrupt signal is received from the motor control computer in the midst of performance of monitoring at all times surrounding changes of the control object, and at the same time, outputs the interrupt signal to the control computer, and the control computer calculates a displacement amount of the control object in accordance with the accelerating/decelerating routine and the section receives the interrupt signal from the administration computer and outputs the interrupt signal to the administration computer when the motor driver completes an operation in response to the calculated displacement amount of the control object.

5. A motor control apparatus in a numerical control system comprising:
   an administration computer for determining a goal point to where an object is to be displaced, for calculating distance data representing a distance between the goal point and a present position of the control object, and for converting the calculated distance data to a number of pulses corresponding to digital signals such that the number of the pulses indicates travelled distance;
   bi-directional memory means for storing an initial value corresponding to the number of pulses calculated by the administration computer;

a motor control computer for reading the initial value stored in the bi-directional memory means and for performing an accelerating/decelerating routine for dividing the initial value into an accelerating velocity section, uniform velocity section and a decelerating velocity section; and a motor driver for driving a servo motor connected to the object in accordance with the number of the pulses for each section calculated by the motor control computer, wherein the administration computer calculates the number of pulses corresponding to a distance to be covered by the servo motor when an interrupt signal is received from the motor control computer and outputs an interrupt signal to the motor control computer, and wherein the motor control computer calculates a displacement amount of the object in accordance with the accelerating/decelerating routine and the section during which the interrupt signal is received from the administration computer and outputs an interrupt signal to the administration computer when the motor driver completes an operation in response to the calculated displacement amount of the object.

6. A motor control method in a numerical system comprising the steps of:

(a) interpreting a parity check code-extended group code from a program previously prepared for performing numerical control of a control object to thereby calculate a goal point on spatial coordinate axes to where the control object is to be displaced, calculating a distance between the goal point and a present position of the control object on the coordinate axes, and converting displacement of each coordinate to be covered from the calculated distance to the pulses corresponding to an initial value to thereby determine a number of pulses indicating a travelled distance;

(b) storing the initial value corresponding to the number of pulses in bi-directional memory means; and (c) reading the stored initial value to thereby control a motor for applying a driving force to the control object in response to the initial value, wherein the step (a) comprises the step of storing in memory means velocity data inputted by a user through an input apparatus and for calculating the number of pulses on each coordinate axis corresponding to a distance to be covered during a sampling period calculated from a distance to be displaced and the stored velocity data; and the step (b) comprises the step of reading the initial value stored in the bi-directional memory means to thereby perform an accelerating/decelerating routine for dividing the section where the control object travels into an accelerating velocity section, a uniform velocity section and a decelerating velocity section, and for controlling a motor for applying a driving force to the control object in accordance with the number of pulses per section calculated from the accelerating/decelerating velocity routine.

* * * * *